United States Patent
Inoko

(10) Patent No.: US 9,410,678 B2
(45) Date of Patent: Aug. 9, 2016

(54) ILLUMINATION APPARATUS LIGHT SOURCE APPARATUS USING ILLUMINATION APPARATUS AND IMAGE DISPLAY APPARATUS

(71) Applicant: CANON KABUSHIKI KAISHA, Tokyo (JP)

(72) Inventor: Kazuhiro Inoko, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/958,782

(22) Filed: Dec. 3, 2015

(65) Prior Publication Data

US 2016/0084478 A1    Mar. 24, 2016

Related U.S. Application Data

(63) Continuation of application No. 14/611,028, filed on Jan. 30, 2015, now Pat. No. 9,228,720.

(30) Foreign Application Priority Data

Feb. 3, 2014    (JP) ................................. 2014-018956

(51) Int. Cl.
| | |
|---|---|
| *G02B 13/04* | (2006.01) |
| *F21V 13/14* | (2006.01) |
| *F21K 99/00* | (2016.01) |
| *G03B 21/00* | (2006.01) |
| *H04N 9/31* | (2006.01) |
| *F21V 13/08* | (2006.01) |
| *F21V 13/12* | (2006.01) |
| *G03B 21/20* | (2006.01) |
| *F21Y 101/02* | (2006.01) |

(52) U.S. Cl.
CPC . *F21V 13/14* (2013.01); *F21K 9/56* (2013.01); *F21V 13/08* (2013.01); *F21V 13/12* (2013.01); *G03B 21/00* (2013.01); *G03B 21/204* (2013.01); *H04N 9/3158* (2013.01); *F21Y 2101/025* (2013.01)

(58) Field of Classification Search
CPC .......... C12Q 1/6886; C12Q 2600/158; C12Q 2600/156
See application file for complete search history.

(56) References Cited

U.S. PATENT DOCUMENTS

| | | | |
|---|---|---|---|
| 8,342,697 B2 * | 1/2013 | Iwanaga ............... | G03B 21/145 348/743 |
| 2011/0032487 A1 * | 2/2011 | Inoko ................... | G02B 27/283 353/20 |
| 2014/0192419 A1 * | 7/2014 | Inoko ................... | G02B 15/177 359/649 |

* cited by examiner

*Primary Examiner* — Tracie Y Green
(74) *Attorney, Agent, or Firm* — Canon USA Inc. IP Division

(57) ABSTRACT

An illumination apparatus includes a wavelength conversion element to convert light emitted from a light source into converted light and to emit the converted light and unconverted light, a first optical element including a first region guiding the light emitted from the light source to the wavelength conversion element and a second region preventing the unconverted light from traveling to the light source, and a second optical element to guide the converted light in a direction different from a direction of the light source while guiding the light emitted from the light source to the wavelength conversion element. The second optical element is disposed in an optical path between the first optical element and the wavelength conversion element. The light emitted from the light source is incident on the first region, and the unconverted light is incident on both the first region and second region of the first optical element.

11 Claims, 8 Drawing Sheets

ILLUMINATION APPARATUS LIGHT SOURCE APPARATUS USING ILLUMINATION APPARATUS AND IMAGE DISPLAY APPARATUS

CROSS-REFERENCE TO RELATED APPLICATIONS

This application is a Continuation of co-pending U.S. patent application Ser. No. 14/611028 filed Jan. 30, 2015, which claims foreign priority benefit of Japanese Patent Application No. 2014-018956 filed Feb. 3, 2014. The disclosures of the above-named applications are hereby incorporated by reference herein in their entirety.

BACKGROUND OF THE INVENTION

1. Field of the Invention

The present invention relates to an illumination apparatus, a light source apparatus using the illumination apparatus, and an image display apparatus. In particular, the present invention relates to a light source apparatus using a laser diode (LD) light source and a projector using the light source such as a projection display apparatus.

2. Description of the Related Art

In recent years, a projector capable of displaying a color image by using a fluorescent member (phosphor) that can convert blue light emitted from an LD light source into green light and red light has been developed.

The above-described projector is discussed in U.S. Patent Application Publication No. US2010/0328632 and U.S. Patent Application Publication No. US2011/0292349.

In the technique discussed in U.S. Patent Application Publication No. US2010/0328632, a color image is displayed by using blue light emitted from an LD light source in addition to green light and red light emitted as fluorescence light (phosphor light). In the technique, a fluorescence wheel having a diffusion layer capable of transmitting the blue light emitted from the LD light source and a fluorescent layer functioning as a fluorescent member is rotated. When the diffusion layer is irradiated with the blue light emitted from the LD light source, the blue light passes through the fluorescent layer, so as to be guided to an illumination optical system by a reflection mirror. On the other hand, when the fluorescent layer is irradiated with the blue light emitted from the LD light source, green light and red light are emitted in the light source direction, so as to be guided to the illumination optical system by a dichroic mirror.

In the technique discussed in U.S. Patent Application Publication No. US2011/0292349, blue light emitted from a blue light-emitting diode (LED) disposed separately from an LD light source is used in addition to green light and red light emitted as fluorescence light. As described above, the techniques for displaying a color image have been discussed.

SUMMARY OF THE INVENTION

According to an aspect of the present invention, an illumination apparatus includes a wavelength conversion element configured to convert at least part of light emitted from a light source into converted light having a wavelength different from a wavelength of the light emitted from the light source and to emit the converted light and unconverted light having the same wavelength as the wavelength of the light emitted from the light source, a first optical element including a first region configured to guide the light emitted from the light source to the wavelength conversion element and a second region configured to prevent the unconverted light from traveling to the light source, and a second optical element configured to guide the converted light in a direction different from a direction of the light source while guiding the light emitted from the light source to the wavelength conversion element, wherein the second optical element is disposed in an optical path between the first optical element and the wavelength conversion element, and the light emitted from the light source is incident on the first region of the first optical element and the unconverted light is incident on both the first region and the second region of the first optical element.

Further features of the present invention will become apparent from the following description of exemplary embodiments with reference to the attached drawings.

DESCRIPTION OF THE EMBODIMENTS

Although a fluorescent member can convert a wavelength of blue light emitted from an LD light source into wavelengths of green light and red light, not all the wavelength of the blue light is converted thereby. In practice, there is unconverted light returning to the LD light source from the fluorescent member, the wavelength of which is not converted by the fluorescent member.

The unconverted light returning to the LD light source may lower the luminous efficiency of the LD light source by increasing the temperature thereof. Therefore, an amount of the unconverted light returning to the LD light source may desirably be reduced as much as possible.

The present invention is directed to a light source apparatus capable of reducing the amount of unconverted light returning to the light source from a wavelength conversion element and projecting a brighter image.

Exemplary embodiments of the present invention will be described below with reference to appended drawings. Herein, shapes and relative alignment of the constituent elements described in the present exemplary embodiments can be changed as appropriate according to a configuration and various conditions of the apparatus the present invention is applied to. In other words, the shapes of the constituent elements illustrated herein are not intended to limit the scope of the invention to the exemplary embodiments described below.

<Configuration of Projection Display Apparatus>

Figure 1:
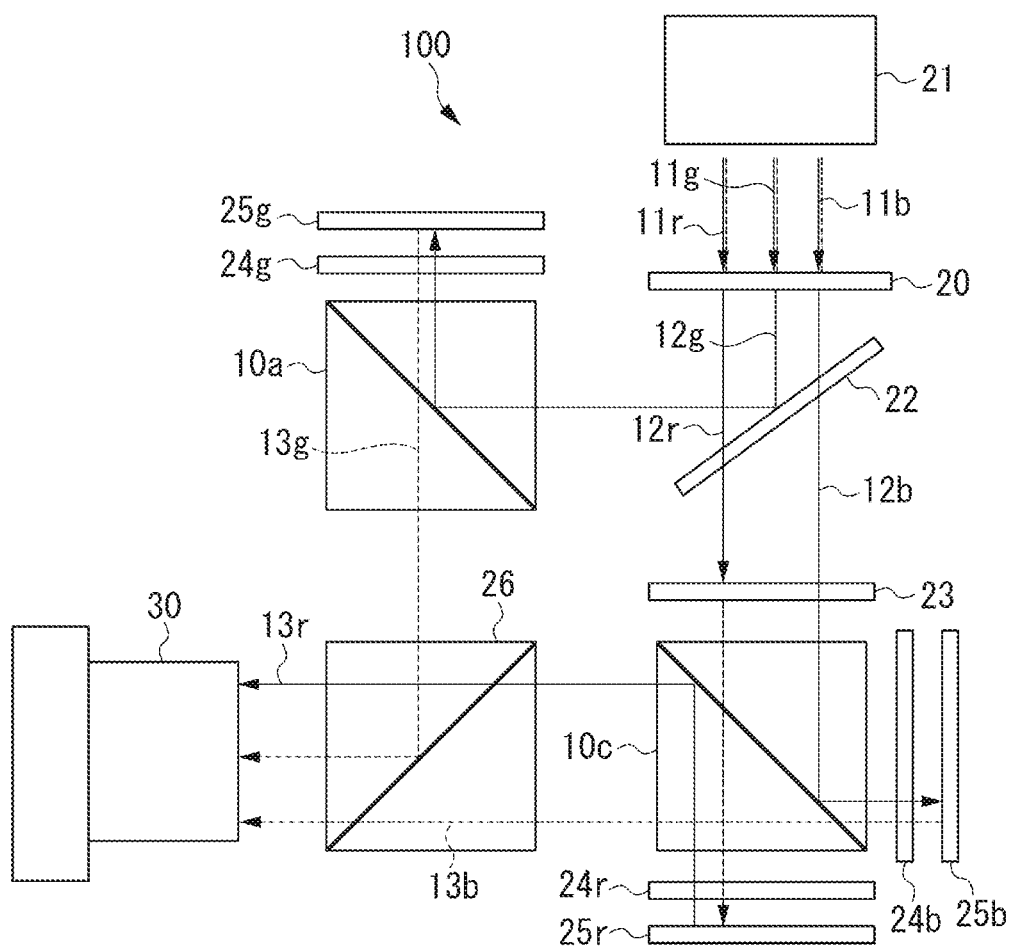
FIG. 1 is an schematic diagram illustrating a configuration of a projection display apparatus on which an illumination apparatus according to exemplary embodiments of the present invention can be mounted.

First, with reference to FIG. 1, a configuration of a projection display apparatus 100 on which a light source apparatus according to exemplary embodiments of the present invention can be mounted will be described.

The display apparatus (projection display apparatus) 100 includes a light source apparatus 21, a polarization plate 20, a dichroic mirror 22, a phase difference plate (wavelength-selective phase difference plate) 23, and polarization beam splitters (PBS) 10 (10a and 10c).

Further, the display apparatus 100 includes ¼π plates 24 (¼π red plate 24r, ¼π green plate 24g, and ¼π blue plate 24b).

The display apparatus 100 further includes liquid crystal panels (reflective liquid crystal panels) 25, i.e., a red liquid crystal panel 25r, a green liquid crystal panel 25g, and a blue liquid crystal panel 25b, serving as light modulation elements.

Furthermore, the display apparatus 100 includes a dichroic prism 26 and a projection lens 30. In other words, the display apparatus 100 is a so-called reflective liquid crystal projector.

The light source apparatus 21 is a light source apparatus described in any one of exemplary embodiments of the present invention described below.

The polarization plate 20 transmits only s-polarized light 12 (s-polarized red light 12r, s-polarized green light 12g, and s-polarized blue light 12b) from among white light 11 (red light 11r, green light 11g, and blue light 11b) emitted from the light source apparatus 21.

The dichroic mirror 22 has a reflectance characteristic of reflecting light in a green wavelength band while transmitting light in red and blue wavelength bands.

The phase difference plate 23 transmits polarized light in a blue wavelength band without converting the polarization direction. On the other hand, the phase difference plate 23 converts the polarization direction of polarized light in a red wavelength band by 90-degree.

The PBSs 10 each reflect s-polarized light and transmit p-polarized light.

The ¼π plates 24 each apply a phase difference of π/2 to obliquely incident light when transmitting through and back through the ¼π plate 24, so as to increase analysis efficiency of the PBSs 10 with respect to the obliquely incident light.

The liquid crystal panels 25 convert the polarization direction of the light incident on the liquid crystal panels 25 according to an image signal. Further, the liquid crystal panels 25 emit image light 13 (red image light 13r, green image light 13g, and blue image light 13b) in which the polarization directions thereof has been converted by the liquid crystal panels 25.

The dichroic prism 26 has a reflectance characteristic of reflecting the light in a green wavelength band while transmitting the light in red and blue wavelength bands.

The projection lens 30 guides the light combined by the dichroic prism 26 to a screen.

A process until the white light 11 emitted from the light source apparatus 21 reaches the projection lens 30 will be described.

Of the white light 11 emitted from the light source apparatus 21, only the s-polarized light passes through the polarization plate 20, so as to be guided to the dichroic mirror 22. Of the s-polarized light 12 guided thereto, the s-polarized green light 12g is reflected and guided to the PBS 10a, while the s-polarized red light 12r and the s-polarized blue light 12b pass through the dichroic mirror 22, so as to be guided to the PBS 10c.

The s-polarized green light 12g guided to the PBS 10a is reflected by the PBS 10a, so as to be guided to the ¼π green plate 24g. The polarization direction of the s-polarized green light 12g is converted by the green liquid crystal panel 25g, so that the s-polarized green light 12g reflects thereon. Of the light reflected on the green liquid crystal panel 25g, the p-polarized light is guided to the dichroic prism 26 as the green image light 13g.

Similar to the above-described s-polarized green light 12g, the s-polarized red light 12r and the s-polarized blue light 12b guided to the PBS 10c are also guided to the dichroic prism 26 as the red image light 13r and the blue image light 13b.

The respective colors of image light 13g, 13r, and 13b guided to the dichroic prism 26 are combined with each other, and the combined image light 13 is guided to the projection lens 30. Through this processes, a color image can be projected and displayed on the screen.

Hereinafter, a configuration applicable to the light source apparatus 21 will be described.

The light source apparatus according to the present exemplary embodiment includes a light source unit (light source) 11, a collimator lens unit 22, a compression lens unit (second lens unit) 3, and a light shielding member (first optical element) 4. The light source according to the present exemplary embodiment further includes a mirror (second optical element) 5, a collective lens unit (first lens unit) 6, and a fluorescent member (wavelength conversion element) 7.

In addition, the illumination apparatus according to the present exemplary embodiment includes the fluorescent member 7, the light shielding member 4, and the mirror 5.

Figure 3A:
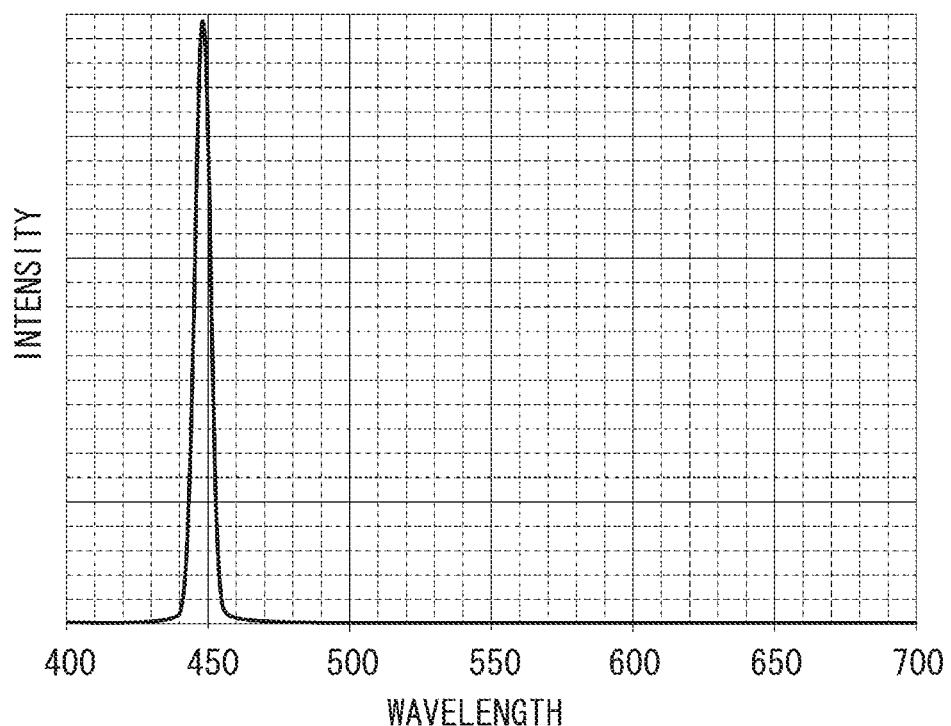
FIGS. 3A and 3B are graphs illustrating spectral characteristics of light emitted from the light source and fluorescence light according to the first exemplary embodiment of the present invention.

The light source unit 11 includes a plurality of light sources (a plurality of light emitting points) 1. In the present exemplary embodiment, the light sources 1 are LD light sources. As illustrated in FIG. 3A, the light sources 1 emit blue light having a wavelength of 448 nm. Therefore, according to the present exemplary embodiment, the light emitted from the light sources 1 is blue light.

Figure 3B:
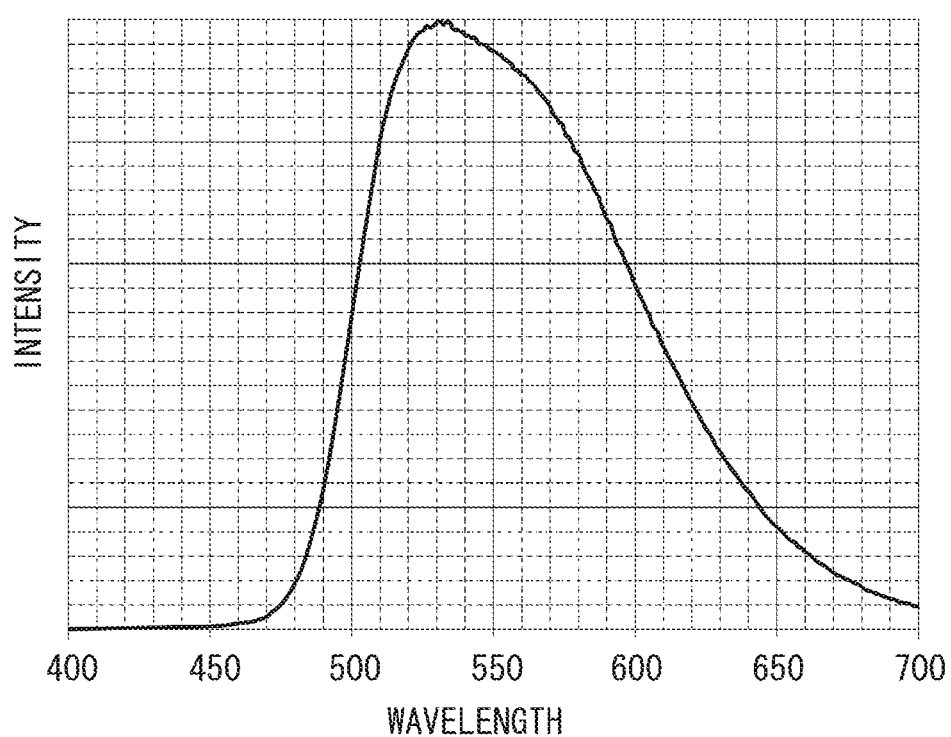

The fluorescent member 7 converts the light emitted from the light sources 1 into fluorescence light (converted light) having a wavelength different from that of the light emitted from the light sources 1, and emits the fluorescence light and unconverted light having a same wavelength as that of the light emitted from the light sources 1. As illustrated in FIG. 3B, the fluorescence light mainly consists of green light and red light.

The light shielding member 4 is an optical element including a region 41 (first region) having a characteristic of guiding the light emitted from the light sources 1 to the fluorescent member 7 and a region 42 (second region) having a characteristic of preventing the unconverted light from proceeding toward the light sources 1.

The mirror 5 is an optical element having a characteristic of guiding the light emitted from the light sources 1 to the florescent member 7 while guiding the fluorescence light to a direction different from a direction of the light sources 1.

The collimator lens unit 22 is configured of a plurality of collimator lenses 2, and substantially collimates the light emitted from the light source unit 11.

The condenser lens unit 6 has positive power in order to guide the light emitted from the light source unit to the fluorescent member 7 while guiding the fluorescence light and the unconverted light to the mirror 5. According to the present exemplary embodiment, the condenser lens unit 6 is configured of four lenses in total.

The compression lens unit 3 compresses the light emitted from the light source unit 11 so as to guide the light to the region 41.

FIG. 2 is a schematic diagram illustrating a configuration of the light source apparatus according to a first exemplary embodiment of the present invention.

Starting from the light source unit 11, each of the constituent elements is aligned in a line in order of the light source unit 11, the collimator lens unit 22, the compression lens unit 3, the light shielding member 4, the mirror 5, the condenser lens unit 6, and the fluorescent member 7. Thus, the fluorescent member 7 is disposed on a position in a direction toward the mirror 5 from the light source unit 11. More specifically, the compression lens unit 3 is disposed on a position between the light source unit 11 and the mirror 5, and the condenser lens unit 6 is disposed on a position between the mirror 5 and the fluorescent member 7.

Figure 2A:
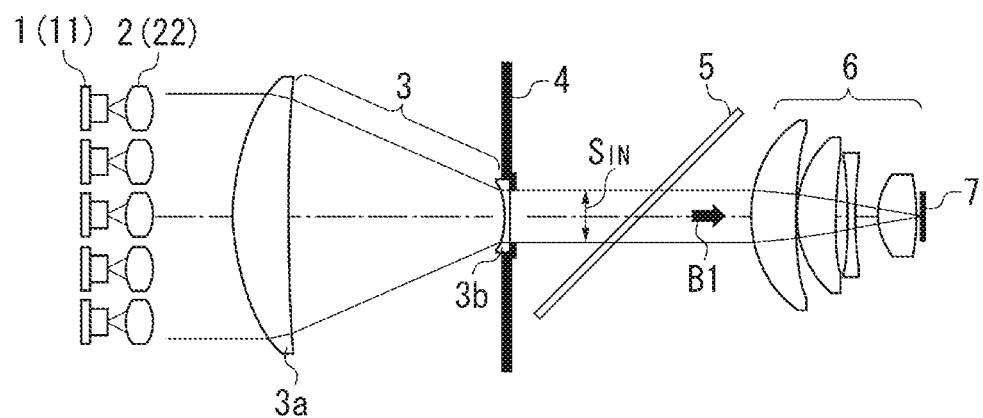
FIGS. 2A and 2B are schematic diagrams illustrating a configuration of an illumination apparatus according to a first exemplary embodiment of the present invention.

First, a process until the light emitted from the light source unit 11 reaches the mirror 5 will be described below with reference to FIG. 2A. Blue light B1 emitted from the light source unit 11 is substantially collimated by the collimator lens unit 22, so as to be incident on the compression lens unit 3. As illustrated in FIG. 2A, the compression lens unit 3 is configured of a total of two lenses, i.e., a lens 3a disposed closer to the light source unit 11 and a lens 3b disposed farther from the light source unit 11. The lens 3a is a positive-power lens for refracting the collimated light emitted through the collimator lens unit 22 to cause the collimated light to be incident on the lens 3b. The lens 3b substantially collimates the light emitted from the lens 3a to guide the collimated light to the mirror 5. In other words, the compression lens unit 3 functions as an afocal optical system capable of guiding the blue light B1 to the mirror 5 by reducing the light flux diameter thereof.

Figure 4:
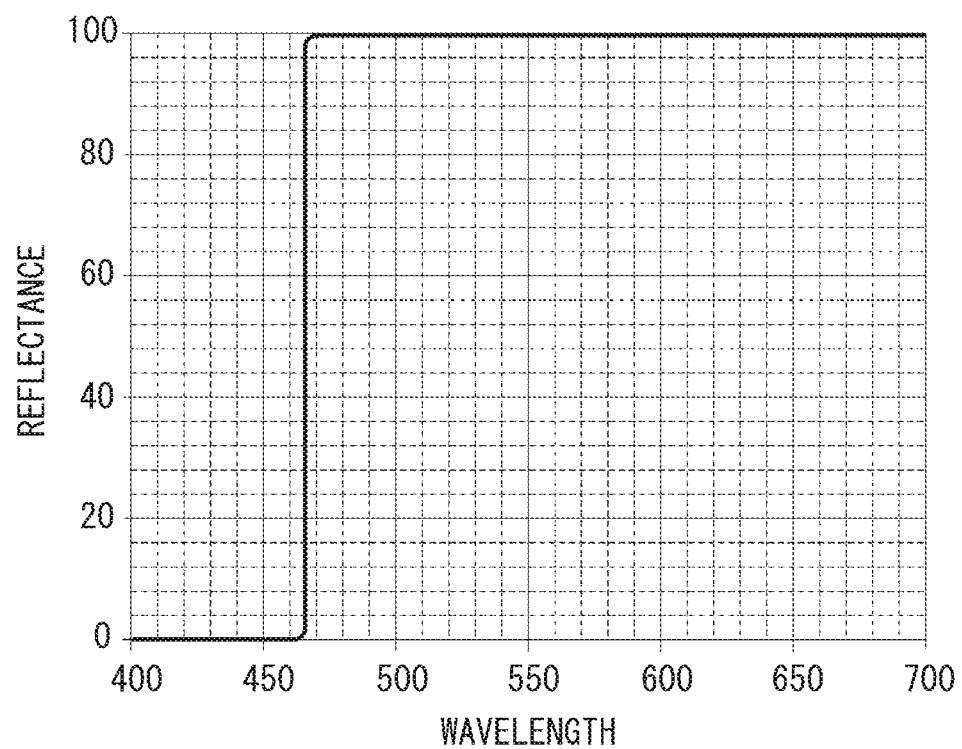
FIG. 4 is a graph illustrating a spectral reflectance characteristic of a dichroic mirror according to the first exemplary embodiment of the present invention.

Subsequently, a process until the blue light B1 reaches the fluorescent member 7 from the mirror 5 will be described below. As illustrated in FIG. 4, the mirror 5 is a dichroic mirror having a reflectance characteristic of transmitting the blue light B1 while reflecting the visible light having a wavelength longer than that of the blue light B1. Accordingly, the blue light B1 incident on the mirror 5 passes through the mirror 5, so as to be guided to the condenser lens unit 6. The blue light B1 incident on the condenser lens unit 6 reaches the fluorescent member 7 by being guided and collected onto a surface of the fluorescent member 7 by the condenser lens unit 6 to form a light source image.

Next, description will be given to a process in which the fluorescent member 7 converts a part of the blue light B1 into fluorescence light having a wavelength different from that of the blue light B1 to emit the fluorescence light and unconverted light having a same wavelength as that of the blue light B1. The fluorescent member 7 is mainly formed of a Yttrium-Aluminum-Garnet (YAG) based material, and emits light having a spectrum illustrated in FIG. 3B as fluorescence light by using the blue light B1 as excitation light. In other words, in the present exemplary embodiment, the fluorescence light consists of green light and red light. In addition, not all the blue light B1 incident on the fluorescent member 7 is converted into the fluorescence light, and unconverted light of the wavelength of which has not been converted also exists. Therefore, in the present exemplary embodiment, the unconverted light consists of blue light. Because the fluorescent member 7 is fixed to a mirror or a metallic component, all the light does not pass through the fluorescent member 7 but reflects thereon.

Figure 2B:
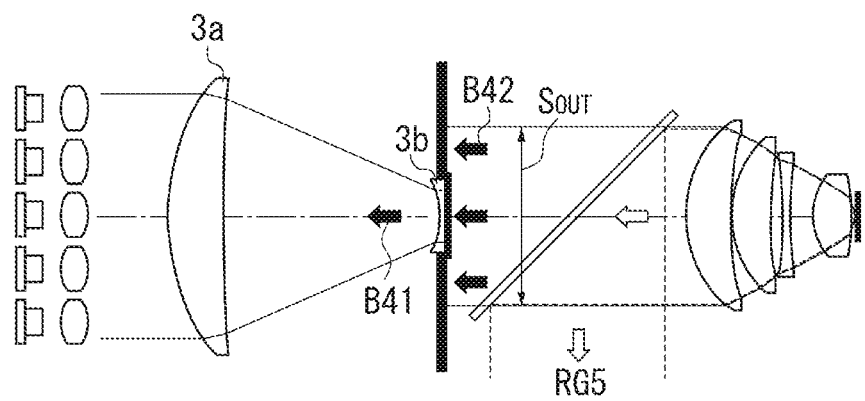

Next, with reference to FIG. 2B, description will be given to a process until the fluorescence light emitted from the fluorescent member 7 reaches the mirror 5 so as to be guided to the illumination optical system. The fluorescent member 7 emits the fluorescence light and the unconverted light to the condenser lens unit 6 in a random direction without determining the emission direction. The condenser lens unit 6 is disposed on a position between the fluorescent member 7 and the mirror 5 in order to collimate the fluorescence light and the unconverted light emitted in a random direction to guide the fluorescence light and unconverted light to the mirror 5 from the fluorescent member 7. As described above, fluorescence light RG5 guided to the mirror 5 from the fluorescent member 7 consists of green light and red light. Further, as described above, the mirror 5 is a dichroic mirror having a reflectance characteristic of transmitting the blue light B1 while reflecting the visible light having a wavelength longer than that of the blue light B1. Accordingly, the fluorescence light RG5 is reflected by the mirror 5 because the wavelength thereof is longer than that of the blue light B1. In the present exemplary embodiment, the illumination optical system (not illustrated) is disposed on a position to which the fluorescence light RG5 is guided by the mirror 5.

Figure 5:
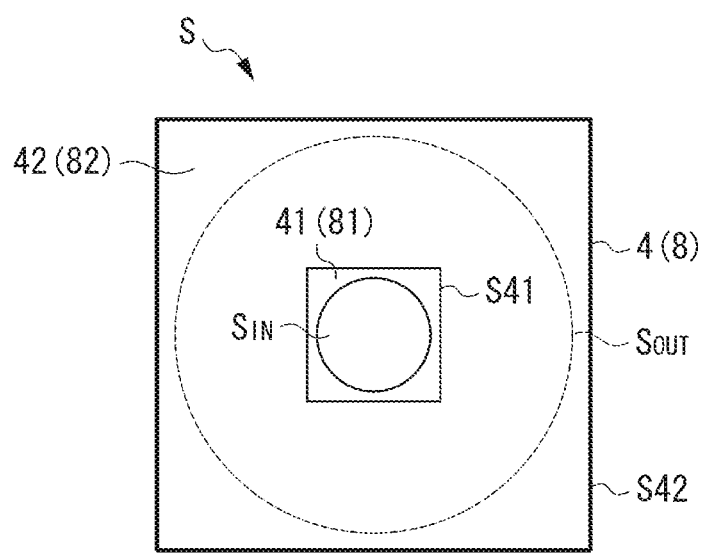
FIG. 5 is a schematic diagram illustrating a light shielding member according to the first exemplary embodiment of the present invention.

Next, a process until the unconverted light emitted from the fluorescent member 7 reaches the light shielding member 4 to return to the light source unit 11 and a process until that reached unconverted light is shielded by the light shielding member 4 will be described with reference to FIGS. 2B and 5. As described above, the unconverted light is substantially collimated by and emitted through the condenser lens unit 6. At this time, the unconverted light is emitted from the condenser lens unit 6 with the cross-sectional area larger than that of the blue light B1. More specifically, as illustrated in FIG. 5, a cross-sectional area $S_{OUT}$ is larger than a cross-sectional area $S_{IN}$. The cross-sectional area $S_{OUT}$ represents a cross-sectional area of the light flux (fluorescence light and unconverted light) emitted through the condenser lens unit 6 on a plane S perpendicular to an optical axis of the condenser lens unit 6 (i.e., plane S is parallel to the sheet surface in FIG. 5). Further, the cross-sectional area $S_{IN}$ represents a cross-sectional area of the light flux emitted through the light shielding member 4 on the plane S. In other words, as illustrated in FIG. 5, the unconverted light is incident on the region 41 (first region) and the region 42 (second region). A configuration of the light shielding member 4 will be described below.

The unconverted light emitted from the fluorescent member 7 passes through the mirror 5 to reach the light shielding member 4 because the wavelength thereof is the same as that of the blue light B1. Herein, a configuration of the light shielding member 4 will be described with reference to FIG. 5. As illustrated in FIG. 5, the light shielding member 4 includes the region 41 (first region) having a characteristic of guiding the blue light B1 to the fluorescent member 7 and the region 42 (second region) having a characteristic of preventing the unconverted light from proceeding toward the light source unit 11. In the present exemplary embodiment, an opening portion is provided on the region 41, and the lens 3b of the above-described compression lens unit 3 is arranged in the opening portion. The lens 3b does not have the dichroic mirror characteristic as described in the above-described mirror 5, so as to transmit light regardless of the wavelength thereof. Further, a light shielding glass for shielding at least the light having a same wavelength as that of the blue light B1 is arranged on the region 42.

In the light shielding member 4, a projection area S41, which is the projection of the region 41 perpendicularly projected on the plane S, is larger than the cross-sectional area $S_{IN}$. Therefore, of the unconverted light incident on the light shielding member 4, unconverted light B41 incident on the region 41 passes through the region 41 to return to the light source unit 11. Likewise, a projection area S42, which is the projection of the region 42 perpendicularly projected on the plane S, is larger than the cross-sectional area $S_{OUT}$. Therefore, of the unconverted light incident on the light shielding member 4, unconverted light B42 incident on the region 42 is shielded by the light shielding glass arranged on the region 42. As described above, the light shielding member 4 having the regions 41 and 42 can guide the blue light B1 to the fluorescent member 7 while preventing the unconverted light B42 from returning to the light source unit 11.

As described above, in the present exemplary embodiment, because the cross-sectional area $S_{OUT}$ is larger than the cross-sectional area $S_{IN}$, an amount of the unconverted light returning to the light source unit 11 from the fluorescent member 7 can be reduced. In order to reduce the amount of the unconverted light returning to the light source unit 11 from the fluorescent member 7, it is preferable that the cross-sectional area $S_{OUT}$ and the cross-sectional area $S_{IN}$ satisfy the formula "$S_{IN}/S_{OUT}<0.8$".

Further, it is more preferable if the cross-sectional area $S_{OUT}$ and the cross-sectional area $S_{IN}$ satisfy the formula "$S_{IN}/S_{OUT}<0.5$".

Figure 6:
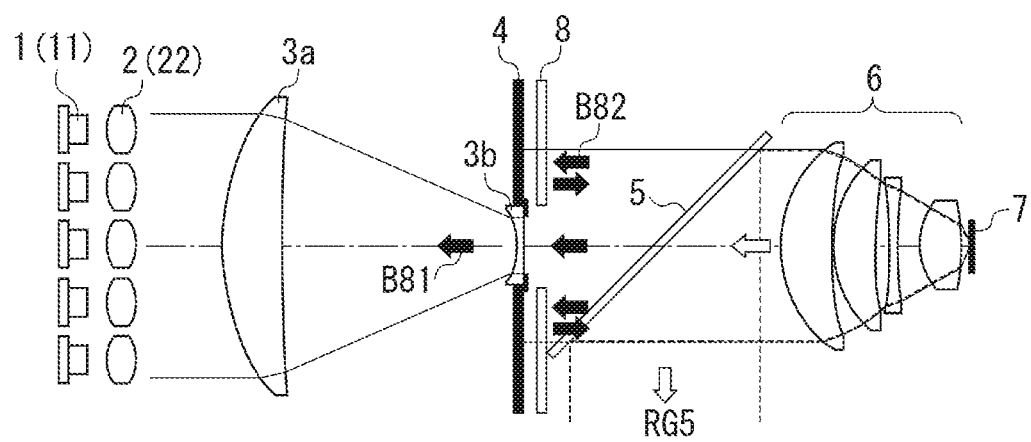
FIG. 6 is a schematic diagram illustrating a configuration of an illumination apparatus according to a second exemplary embodiment of the present invention.

FIG. 6 is a diagram illustrating a configuration of a light source apparatus according to a second exemplary embodiment of the present invention. The present exemplary embodiment is different from the first exemplary embodiment in that the light source further includes a folding mirror (third optical element) 8 disposed in the middle of the optical path from the light shielding member 4 to the mirror 5. In other words, the folding mirror 8 is disposed on a position between the light shielding member 4 and the mirror 5. As illustrated in FIG. 5, the folding mirror 8 includes a region (transmissive region) 81 transmitting the light having a same wavelength as that of the blue light B1 and a region (reflection region) 82 reflecting the light having a same wavelength as that of the blue light B1.

The unconverted light emitted from the fluorescent member 7 reaches the mirror 5 similarly as described in the first exemplary embodiment. In the present exemplary embodiment, the unconverted light passing through the mirror 5 reaches the folding mirror 8. Of the unconverted light incident on the folding mirror 8, unconverted light B81 incident on the region 81 passes through the region 81 and the region 41 of the light shielding member 4, so as to return to the light source unit 11. On the other hand, of the unconverted light incident on the folding mirror 8, unconverted light B82 incident on the region 82 is incident on the fluorescent member 7 again due to the mirror arranged on the region 82, so as to be able to excite the fluorescent member 7.

As described above, the light source according to the present exemplary embodiment further includes the folding mirror 8 disposed in the middle of the optical path from the light shielding member 4 to the mirror 5. With this configuration, a part of the unconverted light can be reused as an excitation light, and thus the light use efficiency can be further improved in comparison to the above-described first exemplary embodiment.

Figure 7:
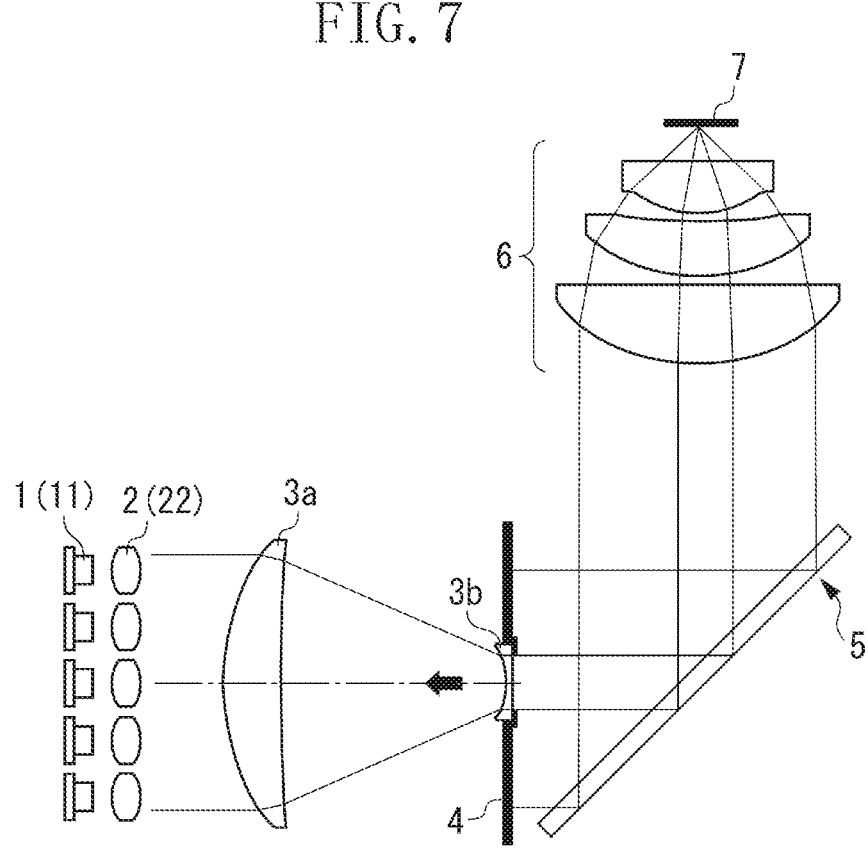
FIG. 7 is a schematic diagram illustrating a configuration of an illumination apparatus according to a third exemplary embodiment of the present invention.

FIG. 7 is a diagram illustrating a configuration of a light source apparatus according to a third exemplary embodiment of the present invention. Similar to the light source described in the first exemplary embodiment of the present invention, the light source according to the present exemplary embodiment includes a light source unit 11, a collimator lens unit 22, a compression lens unit 3, a light shielding member 4, a mirror 5, a condenser lens unit 6, and a fluorescent member 7.

The present exemplary embodiment and the first exemplary embodiment are different in the positional relationship between the light source unit 11 and the fluorescent member 7. In the first exemplary embodiment, the light source unit 11, the mirror 5, and the fluorescent member 7 are aligned in a line. On the other hand, in the present exemplary embodiment, the light source unit 11, the mirror 5, and the fluorescent member 7 are not aligned in a line. More specifically, the fluorescent member 7 is disposed on a position to which the blue light B1 is reflected by the mirror 5.

Figure 8:
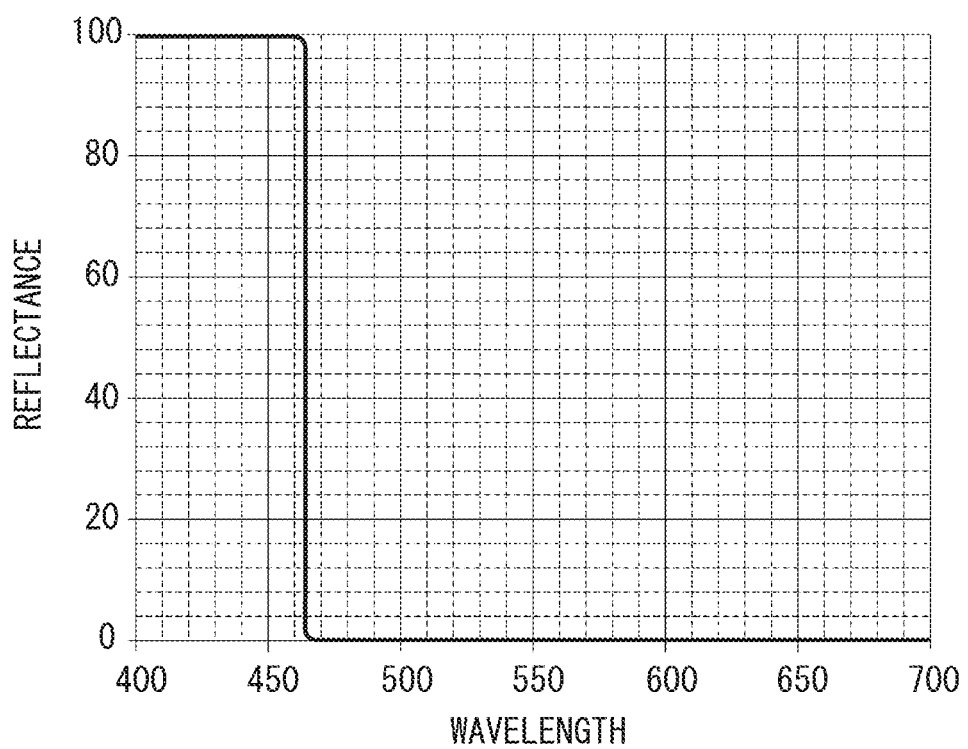
FIG. 8 is a graph illustrating a spectral reflectance characteristic of a dichroic mirror according to the third exemplary embodiment of the present invention.

First, a process until the blue light B1 reaches the fluorescent member 7 will be described with reference to FIG. 7. The blue light B1 reaches the mirror 5 similarly as described in the first exemplary embodiment. However, in the present exemplary embodiment, as illustrated in FIG. 8, the mirror 5 is a dichroic mirror having a reflectance characteristic of reflecting the blue light B1 while transmitting the visible light having a wavelength longer than that of the blue light B1. Accordingly, similar to the above-described first exemplary embodiment, the blue light B1 is guided to the condenser lens unit 6 by reflecting on the mirror 5, so as to be collected on a surface of the fluorescent member 7 by the condenser lens unit 6.

Similar to the above-described first exemplary embodiment, the fluorescent member 7 converts a part of the blue light B1 into fluorescence light having a wavelength different from that of the blue light B1, so as to emit the fluorescence light and unconverted light having a same wavelength as that of the blue light B1.

Next, a process until the fluorescence light emitted from the fluorescent member 7 reaches the mirror 5 so as to be guided to the illumination optical system will be described with reference to FIG. 7. The fluorescence light proceeds to the mirror 5 from the condenser lens unit 6 similarly as described in the first exemplary embodiment. However, as described above, in the present exemplary embodiment, the mirror 5 has a reflectance characteristic of reflecting the blue light B1 while transmitting the visible light having a wavelength longer than that of the blue light B1. Therefore, the fluorescence light passes through the mirror 5, so as to be guided to the illumination optical system.

Next, a process until the unconverted light emitted from the fluorescent member 7 reaches the light shielding member 4 to return to the light source unit 11 and a process until that reached unconverted light is shielded by the light shielding member 4 will be described. The unconverted light proceeds to the mirror 5 from the condenser lens unit 6 similarly as described in the first exemplary embodiment. However, as described above, in the present exemplary embodiment, the mirror 5 has a reflectance characteristic of reflecting the blue light B1 while transmitting the visible light having a wavelength longer than that of the blue light B1. Therefore, the unconverted light is reflected on the mirror 5, so as to reach the light shielding member 4. In the present exemplary embodiment, similar to the above-described first exemplary embodiment, of the unconverted light incident on the light shielding member 4, the unconverted light B41 incident on the region 41 passes through the region 41 to return to the light source unit 11. Further, similar to the above-described first exemplary embodiment, in the present exemplary embodiment, of the unconverted light incident on the light shielding member 4, the unconverted light B42 incident on the region 42 is shielded by the light shielding glass disposed on the region 42.

As described above, similar to the above-described first exemplary embodiment, in the present exemplary embodiment, the blue light B1 can be guided to the fluorescent member 7 by the light shielding member 4 having the regions 41 and 42. Furthermore, it is possible to prevent the unconverted light B42 from returning to the light source unit 11.

In the above-described exemplary embodiments, a configuration of the reflective liquid crystal projector has been described as an example of the image display apparatus on which the light source apparatus according to the exemplary embodiments of the present invention can be mounted. However, the present invention is not limited thereto. For example, the image display apparatus can be a projector using a transmissive liquid crystal panel.

Further, in the above-described exemplary embodiments, a configuration in which the light emitted from the light source apparatus is firstly incident on the polarization plate has been described as a configuration of the projection display apparatus on which the light source apparatus according to the exemplary embodiments can be mounted. However, the present invention is not limited thereto. For example, an integrator using fly-eye lenses and a polarization conversion element for converting unpolarized light into linearly-polarized light may be disposed as a configuration of the projection display apparatus instead of using the polarization plate.

Further, in the above-described exemplary embodiments, a configuration including a projection lens has been described as a configuration of the projection display apparatus on which the light source apparatus according to the exemplary embodiments can be mounted. However, the present invention is not limited thereto. For example, a configuration including a detachable projection lens may be employed as a configuration of the projection display apparatus.

Furthermore, in the above-described exemplary embodiments, although a configuration of the light source apparatus using the LD light source emitting blue light has been described as an example, the present invention is not limited thereto. Any light source such as a blue LED light source may be employed therefor as long as the light source can emit light in a blue wavelength band. Further, for example, an LD light source emitting green light or red light may be employed as long as the light source can display a color image.

Further, in the above-described exemplary embodiments, configurations of the light source apparatus and the projection display apparatus configured to guide white light (visible light) to the illumination optical system have been described as examples. However, the present invention is not limited thereto. The present invention is applicable not only to a projection display apparatus projecting visible light but also to a projection display apparatus projecting only infrared light and ultraviolet light or a projection display apparatus projecting visible light in addition to the infrared light and the ultraviolet light. Furthermore, the present invention is applicable to a light source apparatus mounted on the projection display apparatus configured as the above.

Furthermore, in the above-described exemplary embodiments, a configuration of the light source apparatus using the light shielding member having the opening portion and the light shielding glass has been described as an example. However, the present invention is not limited thereto. For example, the light source may include a light shielding member having an opening portion and a mirror as long as the light source is configured to reduce the amount of the unconverted light returning thereto. Similar to the second exemplary embodiment, by employing the light shielding member having the opening portion and the mirror, a part of the unconverted light can be reused as excitation light.

In addition, in the above-described exemplary embodiments, a configuration of the light source apparatus using a dichroic mirror having a characteristic of transmitting the blue light while reflecting the visible light having a wavelength longer than that of the blue light has been described as an example. However, the present invention is not limited thereto. The reflectance characteristic of the dichroic mirror may be changed as appropriate according to the wavelength of the light emitted from the light source as long as an amount of the unconverted light returning to the light source can be reduced. Further, a configuration using the PBS instead of the dichroic mirror may be employed. In the configuration using the PBS instead of the dichroic mirror, light in the first polarization direction from among the light emitted from the light source can be guided to the fluorescent member, while light in the second polarization direction different from the first polarization direction from among the unconverted light can be guided to a direction different from a direction of the light source. Through the above-described configuration, a part of the unconverted light can be guided to the illumination optical system.

Furthermore, in the above-described exemplary embodiments, a compression lens unit configured of four lenses has been described as an example of the compression lens unit having positive power. However, the present invention is not limited thereto. The compression lens unit may be configured of more than four or less than four lenses as long as the compression lens unit has positive power as a whole unit. In other words, in a case where the compression lens unit includes a single compression lens, the compression lens unit is configured of a single compression lens instead of a compression lens group consisting of a plurality of compression lenses.

Further, in the above-described exemplary embodiments, a configuration of the projection display apparatus on which the light source apparatus according to the exemplary embodiments of the present invention can be mounted has been described as an example. However, the present invention is not limited thereto. For example, the light source apparatus according to the exemplary embodiments of the present invention may be mounted on a liquid crystal display or an electronic viewfinder as a backlight.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An illumination apparatus comprising:
   a wavelength conversion element configured to convert at least part of light emitted from a light source into converted light having a wavelength different from a wavelength of the light emitted from the light source and to emit the converted light and unconverted light having the same wavelength as the wavelength of the light emitted from the light source;
   an optical element configured to receive the light emitted from the light source;
   a first reflection optical element configured to guide the converted light in a direction different from a direction of the light source while guiding the light emitted from the light source to the wavelength conversion element; and a member for holding the optical element;

wherein the first reflection optical element is disposed in an optical path between the optical element and the wavelength conversion element.

2. The illumination apparatus according to claim 1, wherein the member for holding the optical element is configured by a material which can shield the unconverted light traveling from the wavelength conversion element to the light source.

3. The illumination apparatus according to claim 1, wherein the member for holding the optical element is a light shielding member configured to shield the unconverted light traveling from the wavelength conversion element to the light source.

4. The illumination apparatus according to claim 3, wherein the light shielding member is configured to reflect the unconverted light traveling from the wavelength conversion element to the light source.

5. The illumination apparatus according to claim 1, further comprising:

a second reflection optical element disposed in an optical path between the optical element and the first reflection optical element;

wherein the second reflection optical element includes a transmissive region for transmitting the light emitted from the light source and a reflective region for reflecting light having the same wavelength as the wavelength of the light emitted from the light source.

6. The illumination apparatus according to claim 1, further comprising a collimator lens unit configured to collimate the light emitted from the light source.

7. The illumination apparatus according to claim 1, further comprising a first lens unit having positive refractive power configured to guide the converted light and the unconverted light to the first reflection optical element while guiding the light emitted from the light source to the wavelength conversion element.

8. The illumination apparatus according to claim 1, wherein the light source includes a plurality of light emitting points.

9. The illumination apparatus according to claim 8, wherein the optical element is a part of a second lens unit configured to compress light emitted from the plurality of the light emitting points.

10. The illumination apparatus according to claim 9, wherein the second lens unit includes a plurality of lenses and the optical element is a lens arranged on a side nearest to the first reflection optical element among the plurality of lenses.

11. An image display apparatus comprising:

an illumination apparatus;

a light modulation element; and an illumination optical system configured to guide light emitted from the illumination apparatus to the light modulation element, wherein the illumination apparatus comprises:

a wavelength conversion element configured to convert at least part of light emitted from a light source into converted light having a wavelength different from a wavelength of the light emitted from the light source and to emit the converted light and unconverted light having the same wavelength as the wavelength of the light emitted from the light source;

an optical element configured to receive the light emitted from the light source;

a first reflection optical element configured to guide the converted light in a direction different from a direction of the light source while guiding the light emitted from the light source to the wavelength conversion element; and a member for holding the optical element;

wherein the first reflection optical element is disposed in an optical path between the optical element and the wavelength conversion element.

* * * * *